US008907965B2

(12) United States Patent
Chaurasia

(10) Patent No.: US 8,907,965 B2
(45) Date of Patent: Dec. 9, 2014

(54) CLIPPING A KNOWN RANGE OF INTEGER VALUES USING DESIRED CEILING AND FLOOR VALUES

(75) Inventor: Parag Chaurasia, Mumbai (IN)

(73) Assignee: Texas Instruments Incorporated, Dallas, TX (US)

( * ) Notice: Subject to any disclaimer, the term of this patent is extended or adjusted under 35 U.S.C. 154(b) by 1190 days.

(21) Appl. No.: 12/423,824

(22) Filed: Apr. 15, 2009

(65) Prior Publication Data

US 2009/0282224 A1    Nov. 12, 2009

(30) Foreign Application Priority Data

May 8, 2008  (IN) .......................... 1138/CHE/2008

(51) Int. Cl.
  *G06F 12/00*  (2006.01)
  *G06F 9/30*   (2006.01)
  *H04N 1/60*   (2006.01)
  *G09G 5/393*  (2006.01)

(52) U.S. Cl.
  CPC ..... *H04N 1/6058* (2013.01); *G09G 2340/0428* (2013.01); *G06F 9/3001* (2013.01); *G09G 5/393* (2013.01)
  USPC ........... 345/564; 345/619; 345/620; 345/623; 345/624

(58) Field of Classification Search
  USPC .......................... 345/564, 619, 620, 623, 624
  See application file for complete search history.

(56) References Cited

U.S. PATENT DOCUMENTS 6,075,887 A * 6/2000 Brett .............................. 382/167
6,504,495 B1 * 1/2003 Symes et al. .................... 341/95

* cited by examiner

*Primary Examiner* — Maurice L McDowell, Jr.
(74) *Attorney, Agent, or Firm* — Lawrence J. Bassuk; Frederick J. Telecky, Jr.

(57) ABSTRACT

An aspect of the present invention clips a sequence of data values within a known range (defined by a set of integer values) by a ceiling value and a floor value. In an embodiment, such a feature is obtained by first storing in each of a sequence of memory locations a respective value corresponding to each integer value, with a stored value in a memory location equaling the floor value if the memory location corresponds to an integer having a value less than the floor value, equaling the ceiling value if the memory location corresponds to an integer having a value greater than the ceiling value, and equaling the value of the corresponding integer otherwise. When a sequence of data values are thereafter received for clipping, the clipped value for each data value is obtained by merely retrieving a corresponding stored value from the corresponding location.

21 Claims, 3 Drawing Sheets

Figures 3C, 3D, 3E:
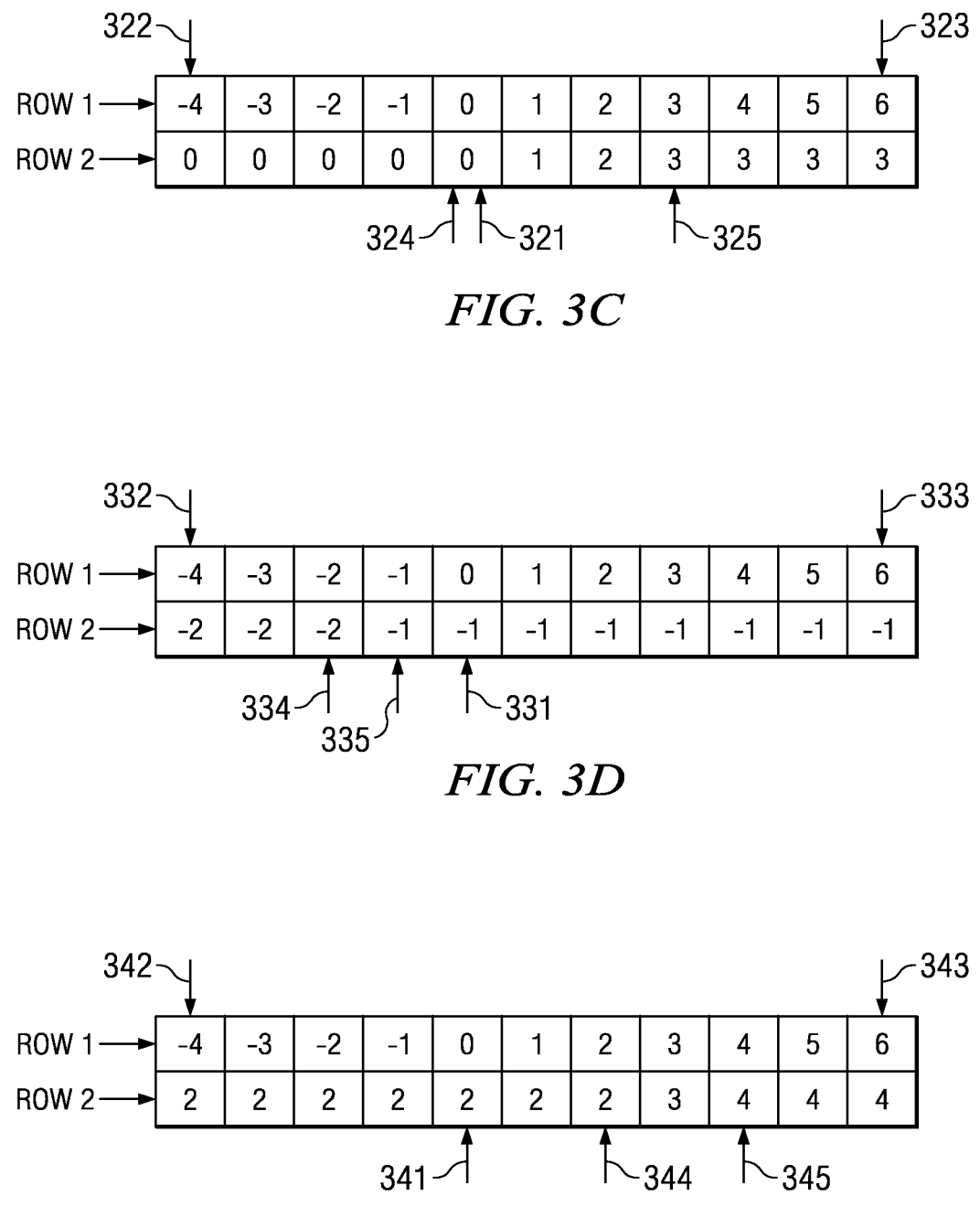

| | 322 | | | | | | | | | | 323 |
|---|---|---|---|---|---|---|---|---|---|---|---|
| ROW 1 → | -4 | -3 | -2 | -1 | 0 | 1 | 2 | 3 | 4 | 5 | 6 |
| ROW 2 → | 0 | 0 | 0 | 0 | 0 | 1 | 2 | 3 | 3 | 3 | 3 |

| | 332 | | | | | | | | | | 333 |
|---|---|---|---|---|---|---|---|---|---|---|---|
| ROW 1 → | -4 | -3 | -2 | -1 | 0 | 1 | 2 | 3 | 4 | 5 | 6 |
| ROW 2 → | -2 | -2 | -2 | -1 | -1 | -1 | -1 | -1 | -1 | -1 | -1 |

| | 342 | | | | | | | | | | 343 |
|---|---|---|---|---|---|---|---|---|---|---|---|
| ROW 1 → | -4 | -3 | -2 | -1 | 0 | 1 | 2 | 3 | 4 | 5 | 6 |
| ROW 2 → | 2 | 2 | 2 | 2 | 2 | 2 | 2 | 3 | 4 | 4 | 4 |

CLIPPING A KNOWN RANGE OF INTEGER VALUES USING DESIRED CEILING AND FLOOR VALUES

RELATED APPLICATION(S)

The present application claims the benefit of co-pending India provisional application serial number: 1138/CHE/2008, entitled: "Novel clipping solution for processors which do not have Saturate instruction", filed on May 8, 2008, naming Texas Instruments Inc. (the intended assignee of this US Application) as the Applicant, and naming the same inventor as in the present application as inventor, and is incorporated in its entirety herewith.

BACKGROUND OF THE INVENTION

1. Technical Field

Embodiments of the present disclosure relate generally to clipping a known range of integer values by desired ceiling and floor values with reduced number of operations.

2. Related Art

Clipping refers to transforming a set of integer values to a same number of transformed values such that each transformed value equals a floor value if the corresponding integer value is less than the floor value, equals a ceiling value if the corresponding integer value is greater than the ceiling value, and equals the corresponding integer value itself otherwise.

There are situations in which such a set of integer values is within a known range, implying that there are specified upper and lower limits to the integer values that are to be transformed by a clipping operation. For example, a processor may provide pixel values (e.g., in RGB format) representing images of objects (physical), with the pixel values having a range wider than that desired (or meaningfully usable). The range of values of the pixels may then need to be clipped (using corresponding processor instructions), such that the clipped values lie within a range (often smaller than the original range) specified by desired ceiling and floor values.

It may be desirable to perform clipping with a reduced number of operations to meet one or more requirements such as, without limitation, reduce computation time in a processor, minimizing power consumption, etc.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An aspect of the present invention clips a sequence of data values within a known range (defined by a set of integer values) by a ceiling value and a floor value. In an embodiment, such a feature is obtained by first storing in each of a sequence of memory locations a respective value corresponding to each integer value, with a stored value in a memory location equaling the floor value if the memory location corresponds to an integer having a value less than the floor value, equaling the ceiling value if the memory location corresponds to an integer having a value greater than the ceiling value, and equaling a value of the corresponding integer otherwise.

When a sequence of data values are thereafter received for clipping, the clipped value for each data value is obtained by merely retrieving a corresponding stored value from the corresponding location.

According to another aspect of the present invention, a pointer is set to point to a memory location corresponding to an integer value of zero. Thus, when a data value is received, the data value is added to the pointer to form the address of the memory location from which the (clipped) value is retrieved.

According to one more aspect of the present invention, the above noted aspects are used to clip a sequence of pixel values representing an image to RGB 5, 6, 5 format, such that the clipped values are of suitable size to be packed into a 16-bit data unit.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

BRIEF DESCRIPTION OF VIEWS OF THE DRAWINGS

Example embodiments of the present invention will be described with reference to the accompanying drawings briefly described below.

FIGS. 3A, 3B, 3C, 3D and 3E are examples illustrating the manner in which clipping is performed according to an aspect of the present invention.

The drawing in which an element first appears is indicated by the leftmost digit(s) in the corresponding reference number

DETAILED DESCRIPTION

Various embodiments are described below with several examples for illustration.

1. Example Component

Figure 1:
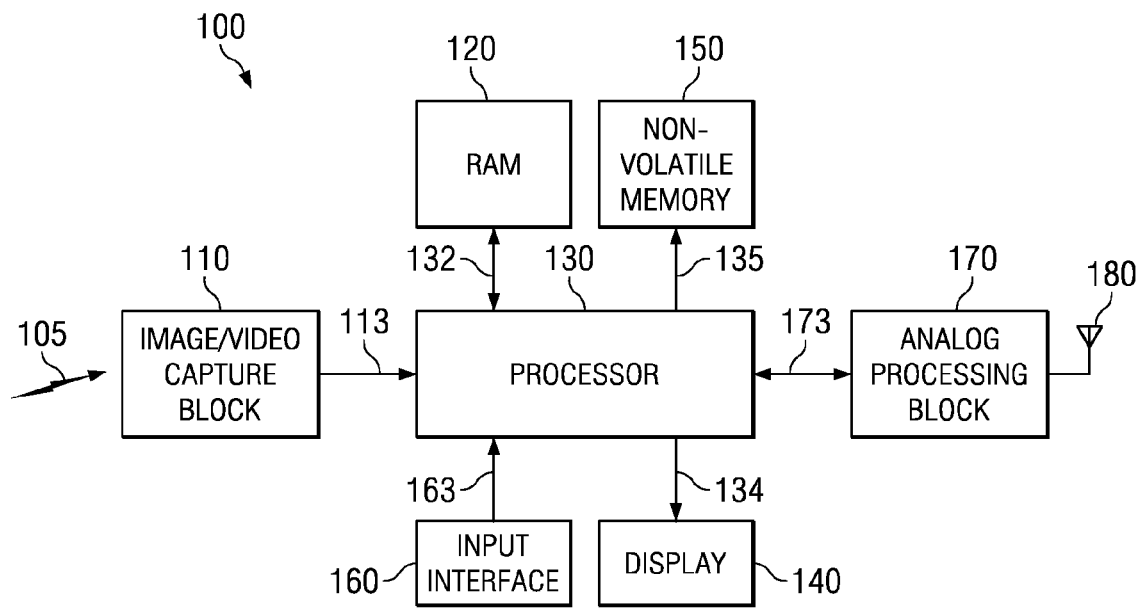
FIG. 1 is a block diagram of an example environment in which several features of the present invention can be implemented.

FIG. 1 is a block diagram of an example device or system in which several aspects of the present invention can be implemented. Device 100 may correspond to a mobile phone with image capture and processing capabilities, and is shown containing image/video capture block 110, random access memory (RAM) 120, processor 130, display 140, non-volatile memory 150, input (I/P) interface 160, analog processing block 170 and antenna 180.

Only the components as pertinent to understanding of the features of the present invention are shown in FIG. 1 (e.g., a speaker is not shown). While the description below is provided with respect to a mobile phone, it should be appreciated that one or more features of the present invention can be implemented in various other environments and devices/systems (digital processing systems in general) as well, without departing from the scope and spirit of several aspects of the invention, as will be apparent to one skilled in the relevant arts by reading the disclosure provided herein.

Analog processing block 170 contains circuitry for transmitting and/or receiving voice and/or data via antenna 180, and performs corresponding analog/radio frequency related processing operations consistent with the technology (e.g., GSM, CDMA) used to provide voice/data calls using mobile phone 100. The processing operations may include, for example, modulation, demodulation, filtering, baseband processing of voice signals, etc. Analog processing block provides to and receives data (e.g., representing voice signals to be transmitted or those received) from processor 130 via path 173.

Image/video capture block 110 generates data 113 representing an image (denoted by arrow 105) of an object. The image may be a single frame captured in case of photo-capture (typically of still images), or of a sequence captured in case of video capture (potentially with objects moving/changing). The images thus captured can be used for either display (for example, on a screen provided in display 140) or for recording (e.g, by storing the data on non-volatile memory 150) by appropriate processing.

Image/video capture block 110 may contain lens assemblies, control mechanisms for lens positioning, etc., image sensors (such as charge coupled devices, CMOS sensors), and other circuitry for generating electrical signals 113. As an example, data 113 may be provided in the form of RGB pixel values. Assuming that a component (red, blue or green) of the RGB pixel value is represented as an n-bit integer value, the component may take on $2n$ values (wherein '' represents the 'power of' mathematical operation). The upper/lower limits to the range may thus be 0/255, −128/+127, etc.

Display 140 displays image frames in response to the corresponding display signals received from processor 130 on path 134. Display 140 may also receive various control signals (not shown) from processor 130 indicating, for example, which image frame is to be displayed, the pixel resolution to be used, etc. Display 140 may also contain memory (frame buffer) internally for temporary storage of pixel values for image refresh purposes, and may be implemented, for example, as a liquid crystal display screen with associated control circuits. Input interface 160 provides a user with the facility to provide inputs via path 163, for example, to capture images, record video, dial numbers, etc.

RAM 120 stores program (instructions) and/or data used by processor 130. Specifically, pixel values that are to be processed and/or to be used later (for display in display 140) may be stored in RAM 120 via path 132 by processor 130.

Non-volatile memory 150 stores image frames received from processor 130 via path 135. The image frames may be retrieved from non-volatile memory 150 by processor 130 and provided to display 140 for display. Non-volatile memory 150 may be implemented as flash memory. Alternatively, non-volatile memory 150 may be implemented as a removable plug-in card. Various data related processing of voice calls and data transfers (via antenna 180) may also be stored in RAM 120 or non-volatile memory 150.

Non-volatile memory 150 may contain additional memory units (e.g. ROM, EEPROM, etc.), which store various instructions, which when executed by processor 130 provide various features of the invention described herein. In general, such a memory unit (including RAMs, non-volatile memory, removable or not) from which instructions can be retrieved and executed is referred to as a computer (or machine) readable storage medium. It should be appreciated that the computer readable storage medium can be deployed in various other embodiments, potentially in devices, which are not mobile phones, but providing several features described herein. The term 'memory' is used in the application to refer in general to either or both of RAM 120 and non-volatile memory 150.

Processor 130 may contain multiple processing units, with each processing unit potentially being designed for a specific task. Alternatively, processor 130 may contain only a single general purpose processing unit. Processor 130 may contain registers and/or memory internally as well.

Processor 130 performs various operations to provide telephone features, as well as processing of digital image data (e.g., pixel values) received on path 113. Processor 130 provides processed image data for display to display 140 via path 134. Processor 130 may also perform various other operations to provide several features to a user of mobile phone 100.

According to an aspect of the present invention, processor 130 clips data values representing various physical objects (e.g., images representing physical objects) using desired ceiling and floor values with reduced number of operations. Such clipping may be performed for various reasons. However, in an embodiment, such clipping is performed to present image data in 16-bit RGB 5:6:5 format (suitable for display on display 140). The details of clipping operation in an embodiment are described next.

2. Clipping

Figure 2:
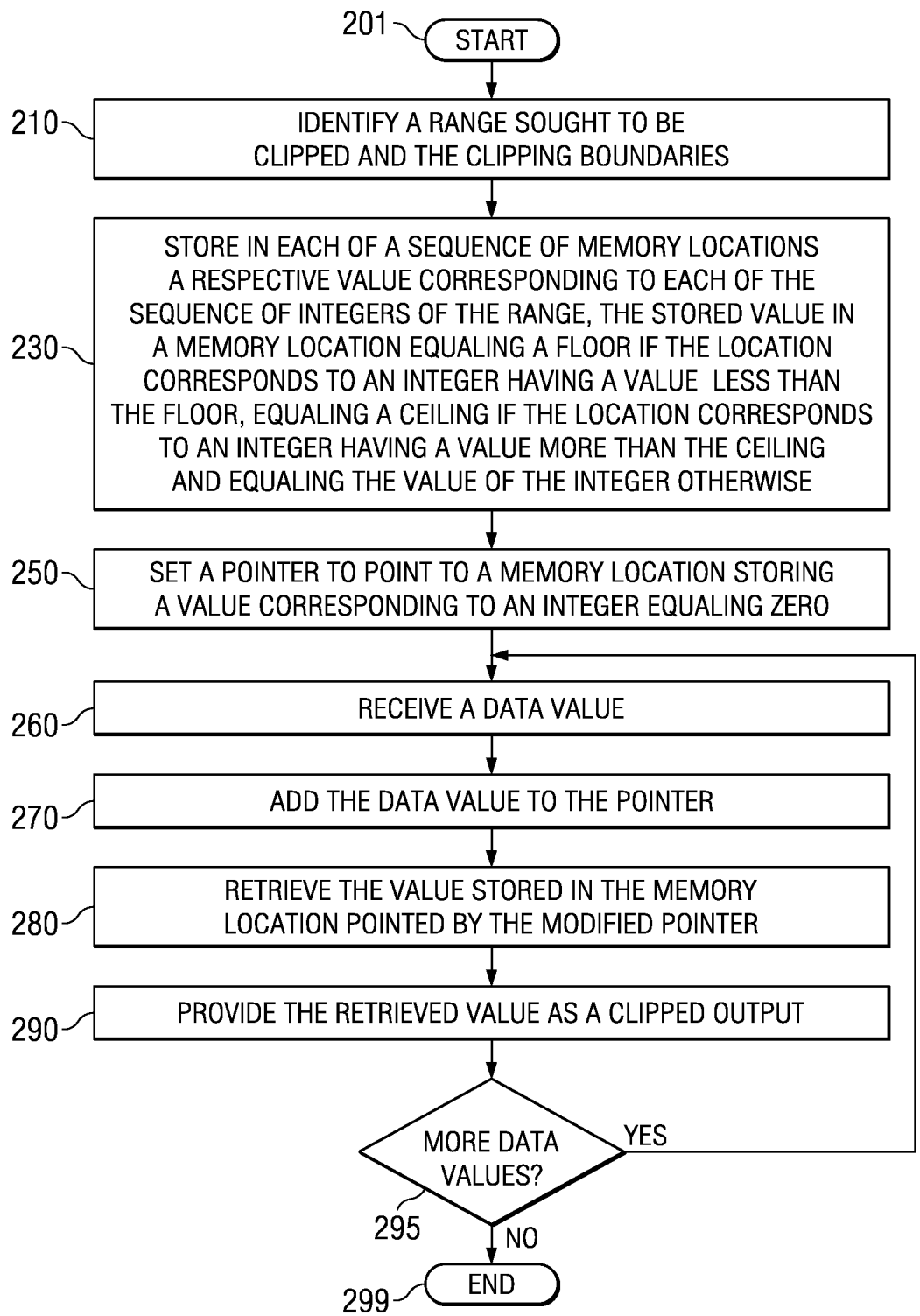
FIG. 2 is a flowchart illustrating the manner in which a known range of integer values are clipped, in an embodiment of the present invention.

FIG. 2 is a flowchart illustrating the manner in which a known range of integer values are clipped, in an embodiment of the present invention. The flowchart is described with respect to the components of FIG. 1 merely for illustration. However, various features described herein can be implemented in other environments, as will be apparent to one skilled in the relevant arts by reading the disclosure provided herein.

Furthermore, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, processor 130 identifies a range sought to be clipped and the clipping boundaries. The range is represented by a sequence of integers and the boundaries are defined by a floor value and a ceiling value. The range and boundaries may be identified in any way, including, for example, based on user provided inputs or processing logic specific to the environment.

With respect to the example embodiment of FIG. 1, the three ranges may be present, respectively for R, G and B components generated (for example, from corresponding Y, U, and V values) by processor 130. As noted above, each range may span 256 values in case of representation by eight bits. Control then passes to step 230.

In step 230, processor 130 stores in each one of a sequence of memory locations, a respective value corresponding to one of the sequence of integers of the range. The value stored in a memory location equals a lower boundary (floor value) if the location corresponds to an integer having a value less than the lower boundary, equals an upper boundary (ceiling value) if the location corresponds to an integer having a value more than the upper boundary and equals the value of the integer if the integer has a value between (and including) the upper boundary (ceiling value) and the lower boundary (floor value). Control then passes to step 250.

In step 250, processor 130 sets a pointer to point to a memory location storing a value corresponding to an integer equaling zero. It is noted that when the integer range does not include zero, the pointer is set to point to the memory location that would have stored an integer value of zero had the input range included the value zero. The pointer specifies an address of the memory location, and may be stored in memory itself, or in a register in processor 130. Control then passes to step 260.

In step 260, processor 130 receives a data value (equaling one of the integers forming the range identified in step 210). With respect to the embodiment of FIG. 1, the data value may be a R, G or B value (respectively, occupying greater than 5, 6 and 5 bits, that is, unclipped) after color space transformation and conversion from YUV (or YCbCr) to RGB (5,6,5) format. Control then passes to step 270.

In step 270, processor 130 adds the data value to the pointer. Thus, the pointer is incremented by the data value if the data value is a positive integer, decremented by the data value if the data value is a negative integer, and not modified otherwise. Control then passes to step 280.

In step 280, processor 130 retrieves the value stored in the memory location pointed by the modified pointer (modified in step 270). Control then passes to step 290.

In step 290, processor 130 provides the retrieved value as a clipped output. In the embodiment of FIG. 1, the clipped output is provided to display 140 and images are rendered (in a known way), based on the clipped RGB values generated in the (5, 6, 5) format. Control then passes to step 295, in which processor 130 checks if more data values need to be clipped. If there are more data values, control passes to step 260. Otherwise, control passes to step 299, in which the flowchart ends.

While steps 250, 260, 270 and 280 together operate to generate a clipped value, other techniques/approaches may also be used to generate a clipped value based on the values stored in step 230.

It may be appreciated from the foregoing description, that the clipped value is generated by merely retrieving a value from the memory. When a large number of data values are to be saturated/clipped, the aggregate number of operations is minimized.

It should be appreciated that the approaches of FIG. 2 can be applied to clip any range with known (finite) upper/lower limits, as described below first with examples.

3. Examples

FIGS. 3A through 3E illustrate the manner in which a range is clipped using desired floor and ceiling values in an embodiment of the present invention. Row 1 of each of FIGS. 3A-3E shows the corresponding integers (of the range), and is shown for easy reference, but is not meant to represent any memory storage. Row 2 in each of FIGS. 3A-3E represents a sequence of (contiguous) memory locations (cells) at which processor 130 stores corresponding 'clipped' values.

Figure 3A:
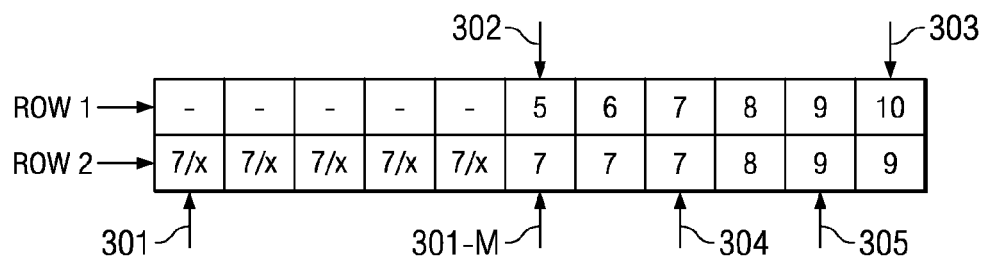

In FIG. 3A, the integer range is from 5 through 10, as marked by arrows 302 and 303. The desired floor value and ceiling value to which the range is to be clipped is respectively 7 (denoted by arrow 304) and 9 (denoted by arrow 305).

Corresponding to the operation of step 230, processor 130 stores in each of a sequence of memory locations shown in row 2 (in which, each box represents a corresponding memory location) the respective values as described above. Thus, the value 7 is stored in locations that correspond to integer values less than 7 (i.e., less than the lower boundary or floor value of 7 as marked by arrow 304. In memory locations corresponding to integer values greater than the upper boundary (ceiling value of 9) processor 130 stores the ceiling value of 9. Processor 130 stores a value equaling the integer value itself in memory locations corresponding to integer values between (and including) the upper boundary (9) and the lower boundary (7).

Corresponding to the operation of step 250, processor 130 sets pointer (denoted by marker 301) to point to the memory location storing a value corresponding to an integer equaling zero. Had the range included the value 0, the 0 would have corresponded to the cell whose address is indicated by marker 301.

As an example, assume that processor 130 receives (step 260) an integer with value 5. Processor 130 adds (step 270) five to pointer 301 to generate a modified (incremented in the example) address 301-M, and retrieves (step 280) the data value 7 'pointed to' by the modified pointer. Processor 130 provides 7 as the clipped output corresponding to the received data value 5. Processor 130 provides clipped values corresponding to other integers in the range 5 to 10 in a similar manner. It is noted that the values stored in the first five memory locations (starting from marker 301) need not be 7, but could be any other value, since the range never takes on a value corresponding to these positions. Hence a 'don't care' (x) is also shown in these locations.

Figure 3B:
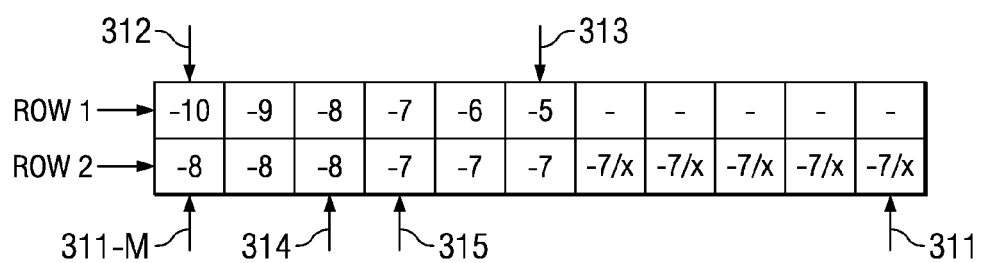

In FIG. 3B, markers 312 and 313 represent the integer range, and markers 314 and 315 represent the floor and ceiling values. Processor sets pointer 311 to point to the location corresponding to the zero value (if it were to be included in the range) of the integer range. As an example assume processor 130 receives a data value of −10. Processor 130 adds the received data value −10 to the address 311, i.e., decrements 311 to point to clipped data value −8 (decremented pointer marked as 311-M). Processor 130 provides clipped values corresponding to other integers in the range −5 to −10 in a similar manner. Again, since the range never takes on a value greater than −5, the corresponding locations could store any value ('don't care'-x) other than −7 also.

The examples in FIGS. 3C, 3D and 3E provide further illustration of the clipping technique, but are not described in the interest of conciseness. It is merely noted that in FIG. 3C, markers 322 and 323 represent the integer range, markers 324 and 325 represent the floor and ceiling values respectively, and pointer 321 is set (initially) to point to the location corresponding to a zero value of the integer. In FIG. 3D, markers 332 and 333 represent the integer range, markers 334 and 335 represent the floor and ceiling values respectively, and pointer 331 is set (initially) to point to the location corresponding to a zero value of the integer. In FIG. 3E, markers 342 and 343 represent the integer range, markers 344 and 345 represent the floor and ceiling values respectively, and pointer 341 is set (initially) to point to the location corresponding to a zero value of the integer.

The techniques noted above may be implemented in mobile phone 100 to generate pixel values in packed 16-bit RGB (5, 6, 5) format, which is conducive for displaying images/video frames on a display device. It may be noted that each digital value may be clipped using a single instruction on processor 130, as described next.

4. Clipping Operations for Representing Images

In an example embodiment in accordance with FIG. 1, image/video capture block 110 generates pixel values in RGB (or YUV or YCbCr) format(s). Processor 130 converts the pixel values into YUV or YCbCr (8, 8, 8) color space, as the YUV or YCbCr format is conducive to perform various image processing operations (for example, JPEG encoding, when the image data is to be saved or further transmitted).

Processor 130 thereafter performs color space transformation of (processed) pixels in YUV (8, 8, 8) representation, to generate corresponding pixel values in RGB (8, 8, 8) representation. Processor 130 further converts the pixel values in RGB (8, 8, 8) representation to RGB(5,6,5) by dividing each of the R, G and B values by $2^3$, $2^2$, and $2^3$ respectively.

After color space transformation and conversion from YUV888 to RGB565 format, each R, G and B value can be in input ranges as provided below:

$-28 \leq \text{Runclipped} \leq 61$;
$-43 \leq \text{Gunclipped} \leq 109$,
$-35 \leq \text{Bunclipped} \leq 67$;

wherein, Runclipped, Gunclipped and Bunclipped respectively represent R, G and B data values before a clipping operation. It is noted that the Runclipped, Gunclipped and Bunclipped values may be represented using 8, 16, 32 bits, etc.

The floor and ceiling values used for clipping the R, G, and B input ranges (for packing to 16 bit RGB5:6:5 format) are as specified by the relationships below:

$0 \leq \text{Rclipped} \leq 31$;
$0 \leq \text{Gclipped} \leq 63$;
$0 \leq \text{Bclipped} \leq 31$ wherein, Rclipped, Gclipped and Bclipped respectively represent R, G and B values after a clipping operation.

Processor 130 stores the clipped values for R and B in a single (same) look-up table or array created in memory, since floor and ceiling values for both R and B input data values are the same. Processor 130 initializes one hundred and three memory locations (35 +1 +67), being the larger of the two ranges for Runclipped and Bunclipped (as noted above) to store the (same) corresponding clipped value for the R and B pixels. Processor 130 stores clipped G values in a separate set of one hundred and fifty three (43 +1 +109) memory locations.

The following relationships specify the correspondence between unclipped inputs and clipped outputs for the R, G and B values:

R Values:
For [Input value $(-28 \leq \text{Runclipped} \leq -1)$]
Output value of Rclipped=0;
For [Input value $(0 \leq \text{Runclipped} \leq 31)$],
Output value of Rclipped=Input value of Runclipped;
For [Input value $(32 \leq \text{Runclipped} \leq 61)$]
Output value of Rclipped=31
G Values:
For [Input value $(-43 \leq \text{Gunclipped} \leq -1)$]
Output value of Gclipped=0;
For [Input value $(0 \leq \text{Gunclipped} \leq 63)$],
Output value of Gclipped=Input value of Gunclipped;
For [Input value $(64 \leq \text{Gunclipped} \leq 109)$]
Output value of Gclipped=63
B Values:
For [Input value $(-35 \leq \text{Bunclipped} \leq -1)$]
Output value of Bclipped=0;
For [Input value $(0 \leq \text{Bunclipped} \leq 31)$],
Output value of Bclipped=Input value of Bunclipped;
For [Input value $(32 \leq \text{Bunclipped} \leq 67)$]
Output value of Bclipped=31

The following assembly language instructions executed by an ARMv4 or ARMv5TE processor (implemented in place of processor 130) specify the memory initialization and clipped value-look-up (for R component values), in an embodiment of the present invention:

LDR r0, =TableClipR ; Load the address of table 'TableClipR', storing
; clipped values corresponding to input R data-
; values, in a register (for example, register r0)
ADD r0, r0, #35 ; increment the address by 35 bytes to set the start
; address (pointer) of 'TableClipR' to point to the
; location corresponding to the input R value 0.
; The above two operations need to be done only once, –
;outside the loop
;Assuming that the input R data value is available in
;register r1 during each iteration, the following single
;instruction will clip the input data value and provide
the clipped output in r1 every iteration.
LDRB r1, [r0, r1] ;Load byte from the memory address r0+r1.
;Before LDRB, $-35 \leq r1 \leq 67$. After LDRB, $0 \leq r1 \leq 31$.
; Retrieve and store in register r1,
; the clipped value for R from memory address r0+r1
; This instruction is invoked iteratively for
; every R data value received.

Instructions similar to those above are executed by processor 130 to clip the G and B values. Thus, clipping of an R, G or B pixel value is achieved using a single instruction (LDRB r1, [r0, r1] in the example assembly language code provided above). Such a feature may be particularly useful in processor environments that do not provide a saturate or clipping instruction.

The technique described above may reduce execution time to perform the clipping, and may require fewer instructions/operations than otherwise, thereby minimizing the number of operations required to clip an input integer range. As an example comparison, the following assembly language code (for an ARMv4 or ARMv5TE processor) describes the operations that may otherwise be required (in alternative prior embodiments) to perform clipping (shown below for R data values):

CMP r0, #0 ; Compare input data (assumed to be stored in register r0) value
; with the integer 0.
MOVLT r0, #0 ; If input data value <0, set clipped output (in r0) to 0.
CMP r0, #31 ; Compare value of input data with the number 31.
MOVGT r0, #31 ; If input data value >31, set clipped output (in r0) to 31.

Thus, four instructions are required to perform the clipping operations, as against only one if the technique described above is used.

The exact savings in terms of processor machine cycles, and therefore power and execution time depends, in general, on the specific processor and/or environment (power supply voltages, etc.) used. However, in general, the approaches described above enable reduction in the number of operations for clipping a known range of integer values by desired ceiling and floor values.

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of clipping a sequence of data values within a known range using a ceiling value and a floor value, said known range being defined by a set of integer values, said method being performed in a digital processing system containing a processor and a memory, said method comprising:
   storing in each of a sequence of memory locations a respective value corresponding to each integer in said set of integer values,
   a stored value in a memory location equaling said floor value if said memory location corresponds to an integer having a value less than said floor value, said stored value equaling said ceiling value if said memory location corresponds to an integer having a value greater than said ceiling value, and said stored value equaling a value of the corresponding integer otherwise;
   receiving a data value to be clipped, said data value equaling one of said set of integer values;
   retrieving a value stored in a memory location corresponding to said one of said set of integer values; and
   providing the retrieved value as a clipped output for said data value;
   wherein the retrieved value that is provided as a clipped output is stored in a memory location before receiving the corresponding data value to be clipped.

2. The method of claim 1, further comprising:
   setting a pointer to point to a memory location storing a value corresponding to an integer equaling zero, said memory location being contained in said sequence of memory locations; and
   adding said data value to said pointer,
   wherein said retrieving retrieves said value from an address pointed by said pointer after said adding.

3. The method of claim 2, wherein said data value is contained in a sequence of data values, each of said sequence of data values is within said known range,
   wherein said receiving, said adding, said retrieving and said providing is performed for each of said sequence of data values.

4. The method of claim 3, wherein said sequence of data values represents a physical object.

5. The method of claim 4, wherein said sequence of data values represents red, blue or green components of pixels representing an image of said physical object.

6. The method of claim 1, wherein said storing is performed before said data value is received.

7. A non-transitory machine readable medium storing one or more sequences of instructions for enabling a system to clip a sequence of data values within a known range using a ceiling value and a floor value, said known range being defined by a set of integer values, wherein execution of said one or more sequences of instructions by one or more processors contained in said system causes said system to perform the actions of:
   storing in each of a sequence of memory locations a respective value corresponding to each integer in said set of integer values,
   a stored value in a memory location equaling said floor value if said memory location corresponds to an integer having a value less than said floor value, said stored value equaling said ceiling value if said memory location corresponds to an integer having a value greater than said ceiling value, and said stored value equaling a value of the corresponding integer otherwise;
   receiving a data value to be clipped, said data value equaling one of said set of integer values;
   retrieving a value stored in a memory location corresponding to said one of said set of integer values; and
   providing the retrieved value as a clipped output for said data value;
   wherein the retrieved value that is provided as a clipped output is stored in a memory location before receiving the corresponding data value to be clipped.

8. The non-transitory machine readable medium of claim 7, further comprising:
   setting a pointer to point to a memory location storing a value corresponding to an integer equaling zero, said memory location being contained in said sequence of memory locations; and
   adding said data value to said pointer,
   wherein said retrieving retrieves said value from an address pointed by said pointer after said adding.

9. The non-transitory machine readable medium of claim 8, wherein said data value is contained in a sequence of data values, each of said sequence of data values is within said known range,
   wherein said receiving, said adding, said retrieving and said providing is performed for each of said sequence of data values.

10. The non-transitory machine readable medium of claim 9, wherein said sequence of data values represents a physical object.

11. The non-transitory machine readable medium of claim 10, wherein said sequence of data values represents red, blue or green components of pixels representing an image of said physical object.

12. The non-transitory machine readable medium of claim 7, wherein said storing is performed before said data value is received.

13. A system comprising:
    a memory containing a sequence of memory locations;
    a processor; and
    a non-transitory machine readable medium storing a sequence of instructions which when executed causes said processor to perform a set of actions which operate to clip a sequence of data values within a known range using a ceiling value and a floor value, said known range being defined by a set of integer values, said set of actions comprising:
    storing in each of said sequence of memory locations a respective value corresponding to each integer in said set of integer values, a stored value in a memory location equaling said floor value if said memory location corresponds to an integer having a value less than said floor value, said stored value equaling said ceiling value if said memory location corresponds to an integer having a value greater than said ceiling value, and said stored value equaling value of the corresponding integer otherwise;
    receiving a data value to be clipped, said data value equaling one of said set of integer values;
    retrieving a value stored in a memory location corresponding to said one of said set of integer values; and
    providing the retrieved value as a clipped output for said data value;
    wherein the retrieved value that is provided as a clipped output is stored in a memory location before receiving the corresponding data value to be clipped.

14. The system of claim 13, said set of actions further comprising:

setting a pointer to point to a memory location storing a value corresponding to an integer equaling zero, said memory location being contained in said sequence of memory locations; and adding said data value to said pointer, wherein said retrieving retrieves said value from an address pointed by said pointer after said adding.

15. The system of claim 14, wherein said data value is contained in a sequence of data values, each of said sequence of data values is within said known range, wherein said receiving, said adding, said retrieving and said providing is performed for each of said sequence of data values.

16. The system of claim 15, wherein said processor comprises:

a first register to store said pointer; and a second register to store said data value, wherein said adding stores the sum of said data value and pointer value in said second register such that said pointer is available in said first register for processing each of said sequence of data values.

17. The system of claim 16, wherein said sequence of data values represents a physical object.

18. The system of claim 17, wherein said sequence of data values represents red, blue or green components of pixels representing an image of said physical object.

19. The system of claim 18, further comprising an image capture block which generates a sequence of pixel values, said processor to form each of said sequence of pixel values in unclipped RGB format, said processor to clip each of the R, G and B components to 5, 6 and 5 bits respectively, said processor to thereafter pack the 5, 6, 5 bits corresponding to each pixel into a 16-bit packed value, wherein, an image is displayed on a display screen based on the 16-bit packed values in said RGB 5:6:5 format.

20. The invention of claim 18, wherein said system is a mobile phone.

21. The system of claim 17, further comprising a display screen, wherein said set of actions further comprise:

displaying an image on said display screen based on the clipped outputs.

\* \* \* \* \*